United States Patent [19]

Tanaka et al.

[11] Patent Number: 5,442,631
[45] Date of Patent: Aug. 15, 1995

[54] COMMUNICATION CONTROL DEVICE

[75] Inventors: Koichi Tanaka; Toshitada Saito, both of Kanagawa, Japan

[73] Assignee: Kabushiki Kaisha Toshiba, Kawasaki, Japan

[21] Appl. No.: 218,899

[22] Filed: Mar. 4, 1994

[30] Foreign Application Priority Data

Mar. 5, 1993 [JP] Japan .................................. 5-045234

[51] Int. Cl.⁶ ............................................. H04L 12/46
[52] U.S. Cl. ................................ 370/85.13; 370/85.2; 370/85.6; 370/85.9
[58] Field of Search ................. 370/85.13, 85.14, 94.1, 370/110.1, 85.1, 85.5, 85.15, 93, 92, 85.2, 85.3, 85.6, 85.9; 395/200, 325

[56] References Cited

U.S. PATENT DOCUMENTS 5,278,836 1/1994 Iimura et al. ...................... 370/85.13
5,291,480 3/1994 Nimon ............................... 370/85.13

Primary Examiner—Douglas W. Olms
Assistant Examiner—Huy D. Vu
Attorney, Agent, or Firm—Foley & Lardner

[57] ABSTRACT

A communication control device has a physical interface for physical interfacing with a network, a processor for processing high rank communication protocol of a frame from the network, a receiving controller for processing low rank communication protocol of the frame, and a communication buffer for storing the frame in a sequence order received. In the device, at least one of the receiving controller has a controller setting each of the receiving controller into one of a communication processing state, a communication standby state, and a halt state, setting one of the receiving controller under the halt state into the communication standby state, and selecting a data structure and giving the selected data structure to the receiving controller under the communication standby state to process the following frame transferred from the network. The receiving controller under the communication standby state transits into the communication processing state in order to receive the frame and transits into the halt state after receiving completion.

15 Claims, 11 Drawing Sheets

FB DATA STRUCTURE

FD DATA STRUCTURE

EXAMPLE OF ONE FRAME STORED IN FD AND FBS

EXAMPLE OF THREE FRAMES LINKED

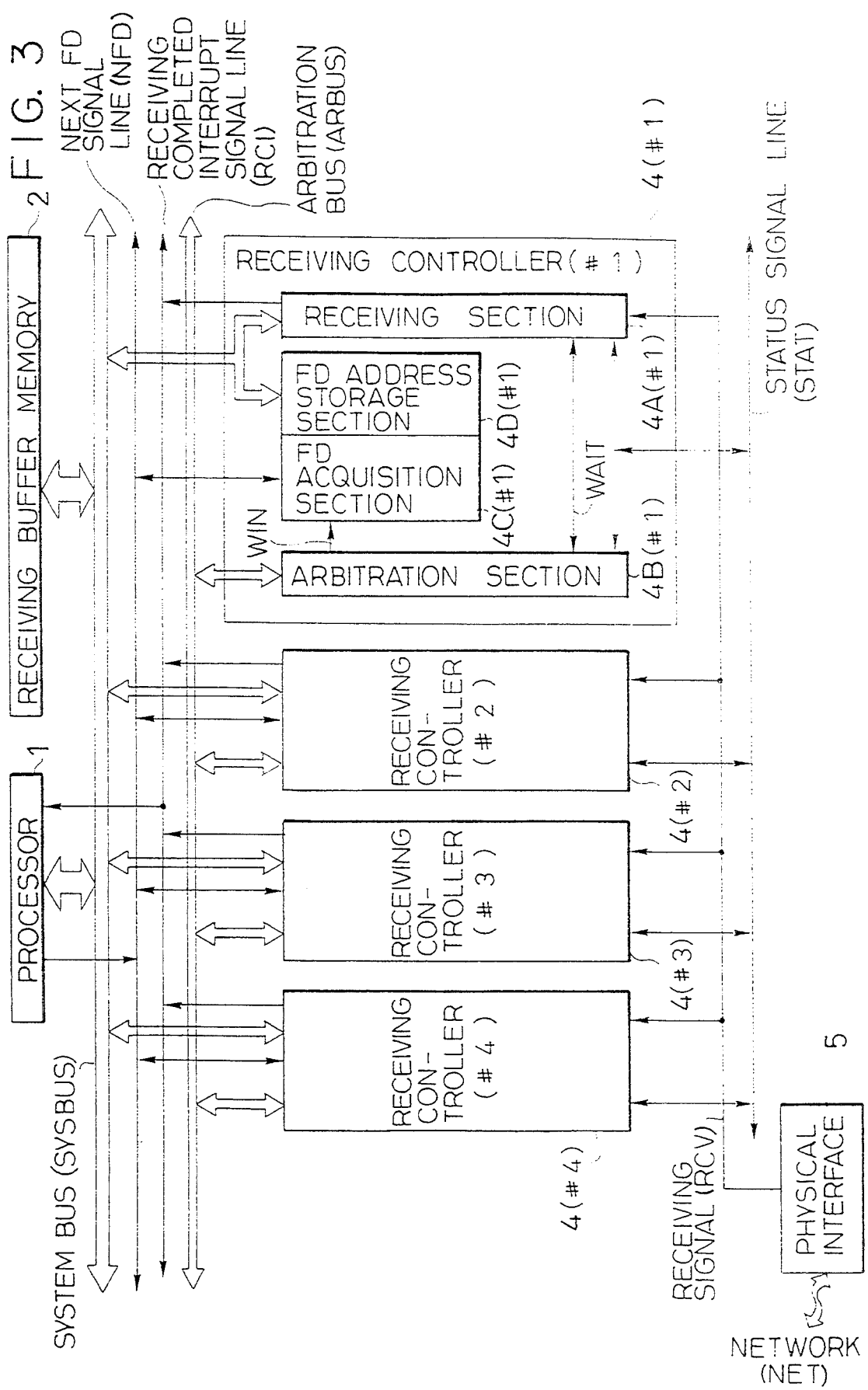

FIG. 9

COMMUNICATION CONTROL DEVICE

BACKGROUND OF THE INVENTION

1. Field of the Invention

The present invention relates to a communication control device used in a communication station such as a bridge station connecting with Local Area Networks (LANs), a file server handling a large volume of data, or the like, for which an extremely high communication performance is required, and, in particular, to a communication control device which is made up of a plurality of communication means, to each of which an identical physical address (or an identical station address) is provided to spread the frame reception load, and in addition wherein it is possible for a high rank protocol processor to receive frames in the sequence received from a network so that the reception performance thereof is improved.

2. Description of the Prior Art

In a LAN communication control device, various Large Scale Integrations (LSIs) are designated for controlling a MAC (Medium Access Control) layer which is standardized by IEEE802 standard.

The system configuration for a conventional communication control device is made up of three major structural elements, as shown in FIG. 1. A processor 101 is a processor for executing high rank protocols of an LLC (Logical Link Control) layer or higher. A conventional communication controller 103 as a communication means is a device for executing protocols of a MAC layer or lower. A common memory 102 is a memory shared between the processor 101 and the conventional communication controller 103. Data received by the communication controller 103 is first written into the shared memory 102, then the host computer subsequently reads out the data in the shared memory 102 and proceeds with the protocol processing.

With conventional LSIs for communication control a data structure as shown in FIG. 2 is constructed in the shared memory 102 and the communication data (hereinafter referred to as a frame) is stored in this structure so that the processor 101 can easily process the data.

This structure of the conventional communication controller 103 will now be explained in detail.

FIG. 2A shows the structure of a frame buffer FB used for storing communication data. The frame buffer FB has a data region 205, a data region head address 202, a data length 203 for the data stored in the data region, and link data 201 showing the address of the next frame buffer FB, and the like. The data which makes up the frame is divided up and stored in the data region 205, therefore one frame is managed by listing and joining together a plurality of frame buffers FB.

FIG. 2B shows the structure of a frame descriptor FD used for controlling a frame. The frame descriptor FD is made up of addresses 212 and 213 of a head frame buffer FB and a last frame buffer FB in the list of frame buffers FB, a frame length 214, a control code 215 for controlling status and the like, and link data 211 showing an address for the next frame descriptor FD.

FIG. 2C shows an example when one frame is divided up and stored in three frame buffers FB, while FIG. 2D shows an example when frames of three different lengths are linked.

In this manner, because frames transferred from a network are converted to various data structure and stored in the shared memory 102, various types of processes must be carried out when a frame is received by the communication controller 103, for example, as proposed in "communication control device" (Japanese Patent Application Number: 3-4001).

However, when the communication speed of a LAN becomes increasingly higher and the time required to transfer one frame becomes shorter than the execution processing time of the communication controller 103, when frames are received continuously from the network, the reception processing is not carried out by the communication controller 103 in time so that the reception of all frames is not possible.

In particular, in a bridge station or a server station, the frames from many communication stations (hereinafter referred to as nodes, in particular, including bridge stations and server stations unless otherwise excluded) are concentrated. In the case where some frames are not received, these frames must be transferred repeatedly from the nodes. This extra retransmission waste the communication capacity of the network, and becomes a hindrance to other normal communication, or, until the decision is made for retransmission, some time elapses therefore the communication is delayed.

For this reason, even when a high speed LAN is used, the user's actual communication speed is not so improved as user expect. Accordingly, even when frames are input continuously to nodes or stations in which frame reception is concentrated, this must be done so that reception is possible.

As countermeasures for such problems in the conventional communication controller, it has been suggested that a plurality of communication controllers be installed in these nodes to spread the communication load. Normally the identical physical address cannot be provided for a plurality of communication controllers installed in one LAN, unique physical addresses must be provided for the respective controllers. Accordingly, a server station must have a plurality of physical addresses, and a transmission station must select a destination address for a frame so that it is possible to spread the communication load on the server exchange.

A frame from a network is processed in these communication controllers concurrently, and it is duplicated, because there is no relationship among communication controllers installed in a server station when these communication controllers has the identical physical addresses. In this case, the processor 101 further includes means having a function which do not process duplicated frames overlappedly. It is difficult in construction to make a data communication system including the processor having the function prescribed above.

Further, in one communication means with the previously outlined frame descriptor FD structure, even though the received frames should be controlled in the sequence received, in the case where a plurality of communication controllers are easily arranged in parallel, there is no means which manages the reception sequence of the frames at reciprocal intervals, therefore the frames are out of sequence and cannot be processed correctly by the processor 101.

Normally, frames which are not received in the correct sequence are discarded, therefore when substitutions are made in the sequence all communication is ineffective. Accordingly, it is absolutely essential to maintain the reception sequence.

As outlined above, with a conventional communication control device after the reception of a frame is completed the status is prepared and it is transferred to the host computer, a certain time in which the communication control device cannot respond to other frame is required for processing.

For this reason, when short frames in data length are input into the conventional communication control device disregards them, some frames is not correctly received. When this occurs at a bridge station, there is the problem that the efficiency of the entire system drops.

SUMMARY OF THE INVENTION

Accordingly, an object of the present invention is, with due consideration to the drawbacks of such conventional communication control devices, to provide a communication control device wherein one communication station is made up of a plurality of communication controllers, to each of which the identical physical address is provided to spread the frame receiving load, and in addition wherein it is possible for the processor to receive and transfer frames in the sequence received from the network so that the reception performance is improved.

A communication control device in a preferred embodiment according to the present invention, comprises:

physical interface means for physical interfacing with a network;

a processor for processing high rank communication protocol of a frame transferred between said communication control device and the network;

a plurality of receiving control means for processing low rank communication protocol of the frame; and communication buffer means containing a data structure list for storing the frame with control data in a sequence order received by said physical interface means, wherein at least one of said receiving control means comprising control means which sets each of said receiving control means into one of a communication processing state, a communication standby state, and a halt state, sets one of said receiving control means under the halt state into the communication standby state, and selects a data structure in said data structure list and give the selected data structure to said receiving control means under the communication standby state in order to process the following frame transferred from the network through said physical interface means.

In the communication control device, each of the plurality of said receiving control means has said control means.

A communication control device in another preferred embodiment according to the present invention, comprises:

physical interface means for physical interfacing with a network;

a processor for processing high rank communication protocol of a frame transferred between said communication control device and the network;

a plurality of receiving; control means for processing low rank communication protocol of the frame; and communication buffer means containing a data structure list for storing the frame in a sequence order received by said physical interface means, wherein each of said receiving control means has three states, specifically, a communication processing state, a communication standby state, and a halt state, at least one said receiving control means comprises:

arbitration means, when said receiving control means transits from the communication standby state to the communication processing state, selects one of said communication means in the communication standby state to set it to the communication standby state; and frame data (FD) management means for acquiring one data structure in said data structure list to store control data of the frame received by the physical interface means, and each of said receiving control means comprises receiving means for processing the low rank protocol of the frame received by the physical interface means when the receiving control means is in the communication standby state and said physical interface means receives the frame from the network.

In the communication control device above, each of said receiving means has three states, specifically the communication processing state, the communication standby state, and the halt state, a status signal is transferred among said receiving control means for advising whether or not said receiving control means is in the communication standby state;

the receiving means processes the frame input from said physical interface means when this receiving means is in the communication standby state, and stores this frame in the communication buffer means, then after the receiving of the frame is completed, stores the control data related with this frame in the data structure list, notifies the completion of receiving to said processor, shifts this receiving means to the halt state, and shifts this receiving means to the communication standby state when said FD management means accesses the data structure for a frame descriptor formed in said communication buffer means;

said arbitration means in each said receiving control means is connected to each other with an arbitration bus and inputs the status signal, and when the status signal indicates that no the receiving means are in the communication standby state and said receiving means are in the halt state, said arbitration means outputs a request on the arbitration bus, so that only one from among said receiving means which have output requests is selected;

said FD management means comprises:
an FD address storage means for storing an address of the frame descriptor for the following frame;
an FD acquisition means for accessing the frame descriptor based on the address stored in the FD address storage means; and
means for notifying all said FD management means of the address of the next frame descriptor at the same time as accessing the frame descriptor; and said FD management means accesses the frame descriptor when said arbitration means outputs a request and selects said receiving control means.

The communication control device above, further comprises an address storage means for storing the address of the data structure as a frame descriptor for the following frame, wherein the FD management means picks out the address of the frame descriptor from the address storage means, accesses this frame descriptor, and sets the address of the next frame descriptor included in this frame descriptor in the address storage means.

In the communication control device above, said communication control device is used in a network with a ring structure;

said physical interface means is provided with a function for simultaneous receiving and transmitting the frame;

the frame received by said physical interface means is provided to a plurality of said receiving means or said receiving control means; and the frame transmitted by one of said receiving means or said receiving control means is transmitted to the network through said physical interface means.

In the communication control device above, said communication control device is used in a network with a ring structure;

said physical interface means and said receiving means or said receiving control means is provided with a function for simultaneous receiving and transmission; wherein:

said physical interface means and a plurality of said receiving means or said receiving control means are connected in a cascade connection, a signal received by said physical interface means from the network is provided to a first receiving means or said receiving control means, the receiving frame of said first receiving means or receiving control means is provided to a second receiving means or receiving control means, and the receiving frame of the last receiving means or receiving control means is structured so that it is transmitted through said physical interface means to the network.

In the communication control device above, said receiving means or said receiving control means is provided with a control signal for selecting whether or not a MAC layer protocol is processed;

one receiving means or receiving control means only is provided in said control means so that the MAC layer protocol is processed, and outputs the frame to said physical interface means.

In the communication control device above, the plurality of said receiving control means has an identical station address.

BRIEF DESCRIPTION OF THE DRAWINGS

These and other objects, features, and advantages of the present invention will become more apparent from the following description of the preferred embodiments taken in conjunction with the accompanying drawings, in which:

FIG. 3 is a configuration diagram of a first embodiment of a communication control device of the present invention.

FIG. 9 is a configuration diagram for a modification of the third embodiment of the communication control device shown in FIG. 7.

DETAILED DESCRIPTION OF THE PREFERRED EMBODIMENTS

Figure 1:
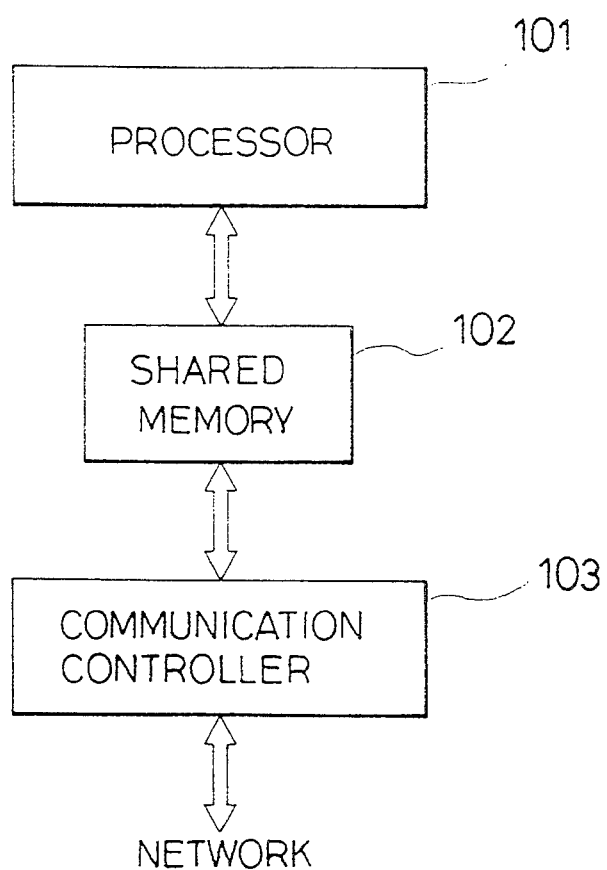
FIG. 1 is a configuration diagram for a conventional communication control system.
Figure 2A:
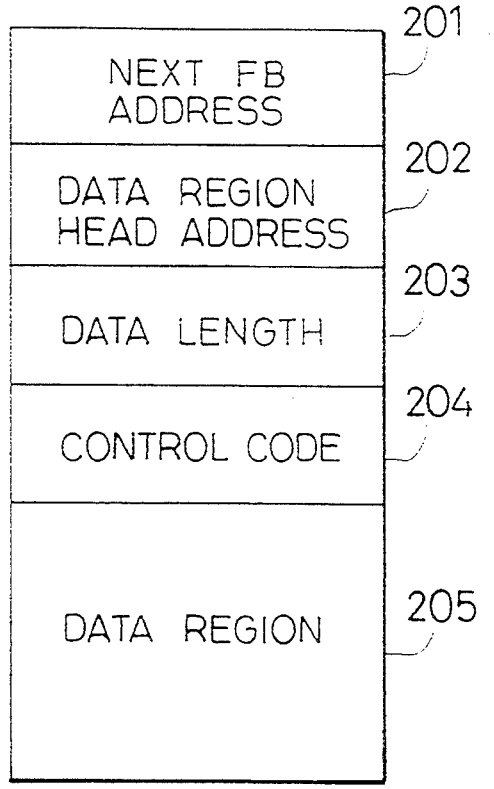
FIG. 2A is a configuration diagram for a frame buffer FB for a frame in a shared memory for communication control.
Figure 2B:
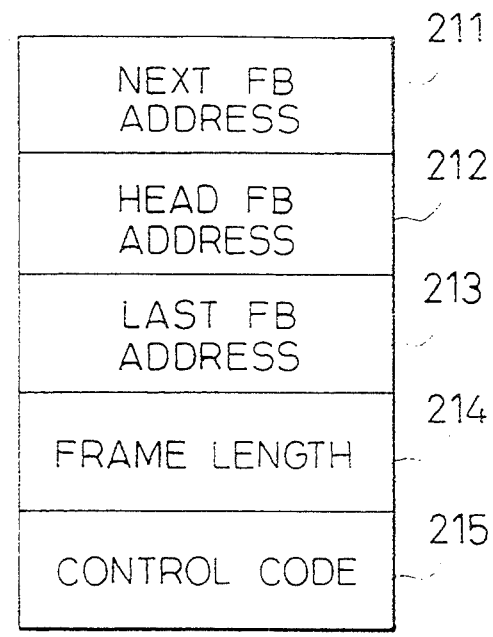
FIG. 2B is a configuration diagram for a frame descriptor FD for a frame in a shared memory for communication control.
Figure 2C:
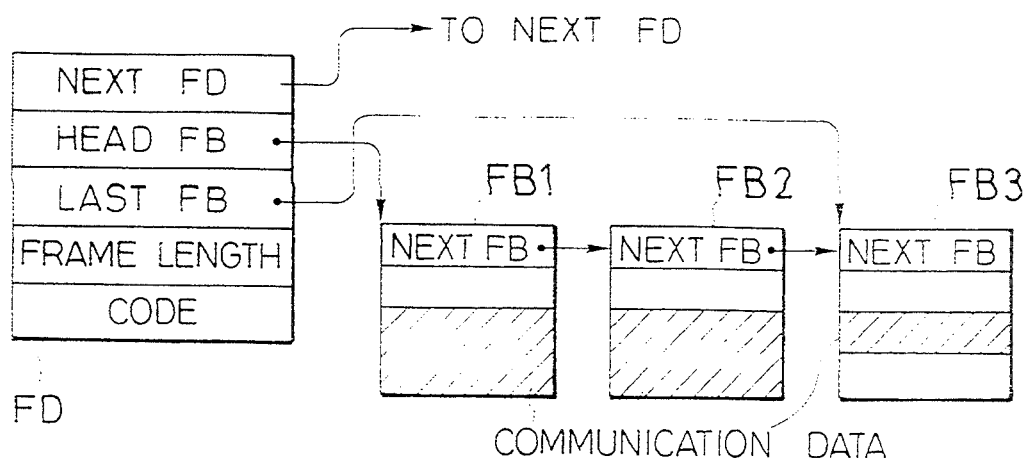
FIG. 2C is a configuration diagram for the case where one frame is divided into three frame buffers FB and stored in a shared memory for communication control.
Figure 2D:
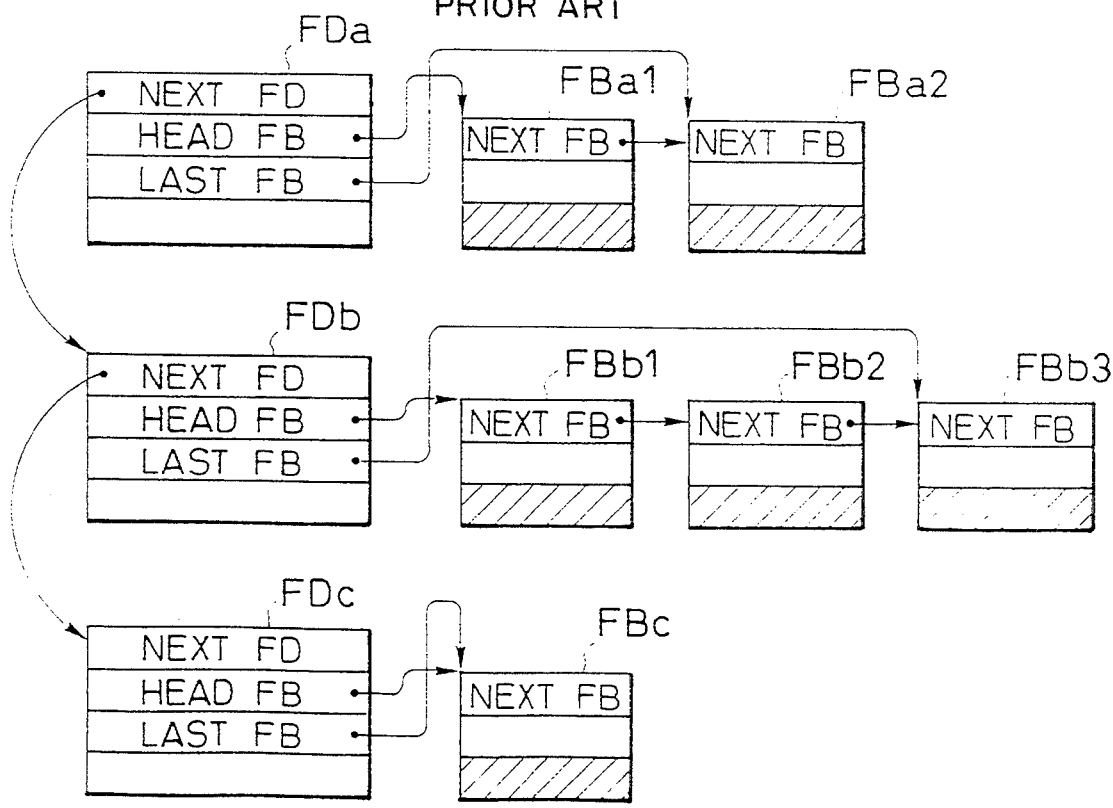
FIG. 2D is a configuration diagram for the case where frames of three different lengths are linked and stored in a shared memory for communication control.

Other features of this invention will become apparent in the course of the following description of exemplary embodiments which are given for illustration of the invention and are not intended to be limiting thereof.

Before describing preferred embodiments of the present invention, we will explain the basic concept of the present invention as follows.

As shown in FIG. 3, a plurality of communication controllers 4(#1) to 4(#4) as communication means for processing low rank communication protocol is connected in a parallel arrangement. In addition, the communication means 4(#1) to 4(#4) exhibit three states, specifically, "a communication processing" state, "a communication standby" state, and "a halt" state.

In a receiving buffer memory 2 as communication buffer means, a data structure list for storing frames in the sequence received from a network NET is formed.

When the communication means 4(#i)(i=1 to 4) in the "communication standby" state are switched to the "communication processing" state for processing the frames, one out of a plurality of communication means 4(#j) (j=1 to 4, j≠i) in the "halt" state is selected and switched to the "communication standby" state while a data structure list for processing the succeeding frame is picked out of the data structure list.

Specifically, the processor 1 formes only one list of frame descriptors FD in the communication buffer means 2 for processing the received frames and provides this list to the communication means 4(#i) in advance of the reception signal. When the communication means 4(#i) is switched to the "communication standby" state, one frame descriptor FD is picked out of the FD list in sequence. The signal received from the network NET is provided simultaneously to the communication means 4(#1) to 4(#4) and the reception of this signal is processed by only one of the communication means 4(#i) which is in the "communication standby" state. This communication means 4(#i) is switched to the "communication processing" state and the received frame is transferred to the communication buffer means 2. When the drawing up of the frame descriptor FD has been completed, the completion of reception is reported to the processor 1.

When the processor 1 is advised that reception has been completed, the reception state is examined, proceeding from the head of the above-mentioned FD list, and the high rank protocol is processed for the frame descriptor FD for which reception has been completed.

In addition, if a yet-unreceived frame descriptor FD is reached, processing is halted at that point and that frame descriptor FD is recorded as the head of the FD list for which reference is commenced at the next reception processing.

As a result, immediately one of the communication means 4(#i) starts frame reception, another communication means 4(#j) is selected in the "communication standby" state so that it is possible to receive the next frame. Because only one communication means can receive at one time, one frame is received in the communication means 4(#1) to 4(#4) and there is no overlapping. Accordingly, the communication means 4(#1) to 4(#4) are provided with the identical physical address.

Also, the frame descriptors FD are assigned one at a time in sequence to the communication means 4(#j) selected in the "communication standby" state, so that the sequence of the frames processed by the processor 1 is the same as the sequence in which they are received from the network NET.

Accordingly, one communication station is made up of a plurality of communication means 4(#1) to 4(#4) which are provided with the identical physical address. The reception load of the frames is distributed so that it is possible to realize a communication control device which can deliver frames in the sequence received from the network NET for the processor 1.

Figure 5:
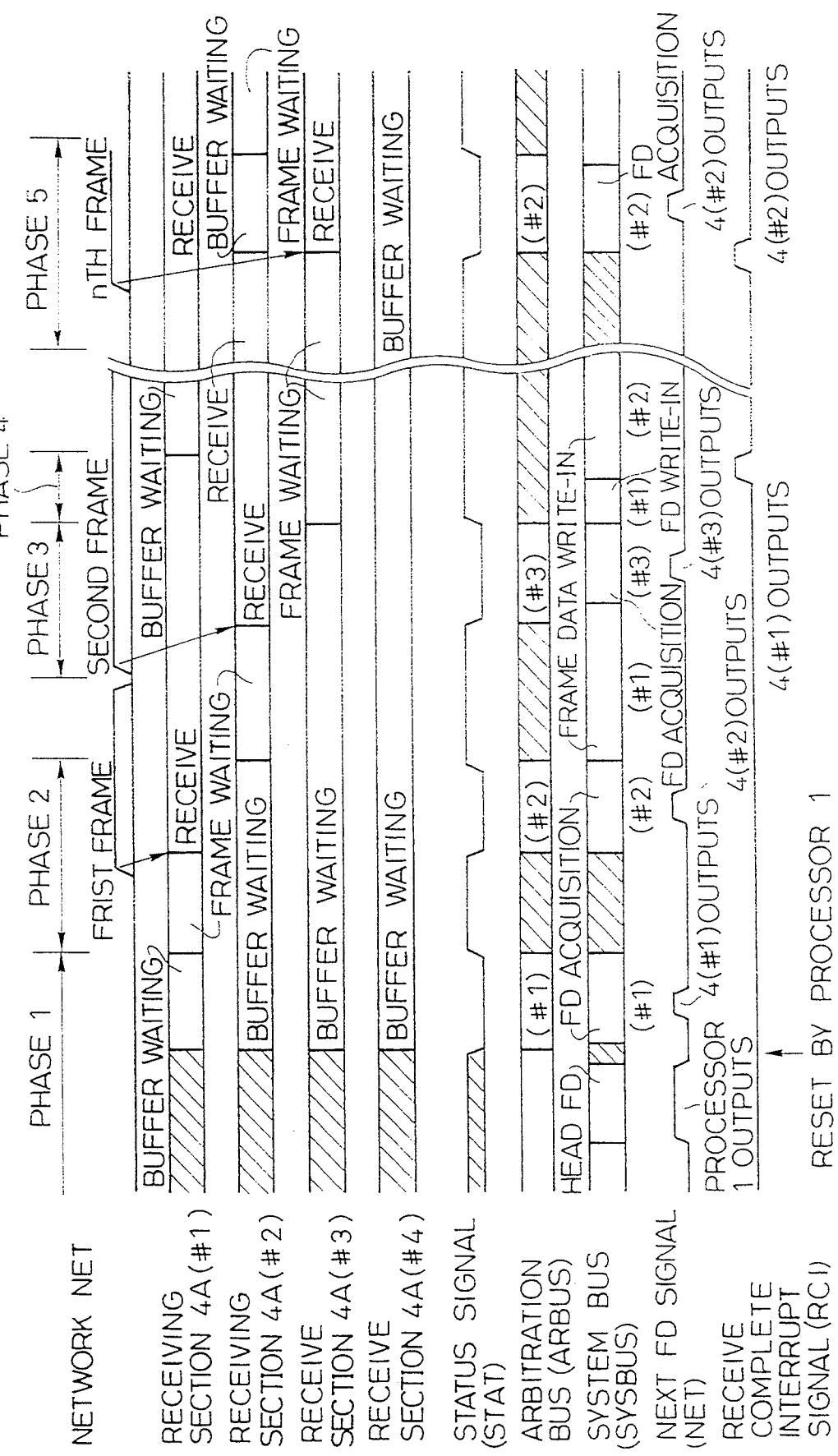
FIG. 5 is a timing chart for explaining the operation of the first embodiment of the communication control device shown in FIG. 3.

In addition, with a communication control device with the special features, as shown in FIG. 5, receiving sections 4A(#1) to 4A(#4) as receiving means, arbitration section 4B(#1) to 4B(#4) as arbitration means, and reception control means 4(#1) to 4(#4) provided with a FD management section as the FD management means are made up as an installation of a plurality of units in parallel.

Also, the reception means 4A(#1) to 4A(#4) in the reception control means 4(#1) to 4(#4) have three states—specifically, the "communication processing" state, the "communication standby" state, and the "halt" state. The receiving buffer means 2 is provided with a data structure list for storing the frames transmitted to the network NET in that sequence.

In the receiving means 4A(#i) (i=1 to 4), when the appropriate receiving means 4A(#i) is in the "communication standby" state a receiving signal RCV input from a physical interface 5 as a physical interface means is processed, the appropriate receiving means 4A(#i) is switched to the "communication processing" state, and the receiving signal RCV is stored in the receiving buffer means 2. Then, after the reception is completed, the data in the receiving buffer means 2 is stored in the above-mentioned data structure list, the processor 1 is notified of the completion of the reception, and the appropriate receiving means 4A(#i) is switched to the "halt" state. When FD management means 4C(#i) and 4D(#i) access the data structure of the frame descriptor FD the appropriate receiving means 4A(#i) is switched to the "communication standby" state. A status signal STAT in the arbitration means 4B(#1) shows that all the receiving means 4A(#1) to 4A(#4) are not in the "communication standby" state, and when the corresponding receiving means 4A(#i) is in the "halt" state, a request is output to an arbitration bus ARBUS, and only one is selected from among one or more corresponding receiving means 4A(#i) which have output a request.

The FD management means has FD address storage means 4D(#1) to 4D(#4) for holding the address of the data structure of a reception-capable frame descriptor FD, and FD acquisition means 4C(#1) to 4C(#4) for accessing the data structure of the frame descriptor FD based on the address of the FD address storage means 4D(#1) to 4D(#4). At the same time as the data structure of the frame descriptor FD is accessed, the address of the data structure of the next frame descriptor FD is connected via a next FD signal line NFD which notifies all the FD management means.

The FD management means including the means 4C(#i) and 4D(#i) access the data structure of the frame descriptor FD when the arbitration means 4B outputs a request and the appropriate reception control means 4(#i) is selected.

The processor 1 prepares only one list of the frame descriptors FD for managing the received frames, and provides this list before reception to the FD management means 4C(#i) and 4D(#i). The FD management means 4C(#i) and 4D(#i) pick out one frame descriptor FD in sequence from the FD list when the appropriate reception control means 4(#i) is switched to the "communication standby" state.

The signal received from the network NET is simultaneously provided to the receiving means 4A(#1) to 4A(#4), and reception processing is carried out by a sole reception means 4A(#i) which is in the "communication standby" state. This receiving means 4A(#i) is switched to the "communication processing" state, the received frame is transferred to the receiving buffer means 2, and, when the preparation of the frame descriptor FD is completed, the processor 1 is notified of the completion of the reception. When the processor 1 receives the notification that the reception has been completed, the reception status is checked, proceeding from the top of the above-mentioned FD list, and the high rank protocol for the frame descriptor FD for which the reception has been completed is processed.

If a yet-unreceived frame descriptor FD is reached the processing is discontinued at that point and that frame descriptor FD is registered as the top of the FD list which is referenced at the start of the next reception process.

As a result, when one receiving means 4A(#i) commences frame reception, another receiving means 4A(#j) is selected in the "communication standby" state so that it is possible to receive the next frame. At the same time, because only one receiving means can receive, one frame is not received by a plurality of receiving means 4A(#1) to 4A(#4). Accordingly, the receiving control means 4(#1) to 4(#4) can be provided with the identical physical address.

In addition, because the frame descriptors FD are allocated one at a time in sequence to the receiving means 4A(#j) selected in the "communication standby" state, the sequence of the frames processed by the processor 1 is the same as the sequence in which they are received from the network NET. Accordingly, a communication control device can be provided wherein it is possible for one communication exchange to be made up of a plurality of receiving control means 4(#1) to 4(#4), which can be provided with the identical physical address for spreading the reception load, and wherein the frames can be transmitted in the sequence received from the network by the processor 1.

An preferred embodiment of the present invention will now be explained with reference to the drawings.

FIG. 3 is a configuration diagram of a first embodiment of a communication control device 300 according to the present invention.

The communication control device 300 of this embodiment is used in an IEEE802.3 type LAN. There are a large number of means in the communication control device 300 related to this embodiment because these means exist in respective receiving control means 4(#1) to 4(#4), therefore to differentiate these means (# number) is appended to the end of the distinguishing code for each means.

For example, a first receiving means 4A in the receiving control means 4(#1) is designated as "receiving means 4A(#1)". The same system is used for other embodiments.

The communication control device 300 as the first embodiment shown in FIG. 3 is made up of a processor 1 for processing upper order communication protocols; a receiving buffer memory 2 for storing frames containing control data and communication data; four receiving controller 4(#1) to 4(#4) for processing low rank communication protocols; and a physical interface 5 for physically interfacing with a network NET.

The processor 1 is a device for processing high rank protocol such as an LLC layer or the like. The processor 1 accesses the receiving buffer memory 2 through a system bus SYSBUS. The processor 1 connects to the receiving controller 4(#1) to 4(#4) through the system bus SYSBUS, a next FD signal line NFD, and a receiving completed interrupt signal line RCI.

The processor 1 makes a data structure of a frame descriptor FD and a frame buffer FB in the receiving buffer memory 2. The frame descriptor FD is linked to another frame descriptor FD in one list by using a next FD address field and set into the FD address storage sections 4D(#1) to 4D(#4) which are later-described.

The frame buffer FB is linked to another frame buffer FB in the same manner using the next FB address field and distributed among the receiving controllers 4(#1) to 4(#4). A means for splitting this FB list is not described here because it bears very little relation to the present invention.

When an interrupt is received from a receiving completed interrupt signal RCI through the receiving completed interrupt signal line the processor 1 checks the FD list in sequence from the beginning, and the high rank protocol is processed for a unit in which the receiving completion status is set. Then, if units in which this status is not set are encountered, the process of following the FD list is terminated.

In the receiving buffer memory 2 the data structure list for storing frames transferred through the network NET in the order received. The receiving buffer memory 2 is connected to the processor 1 and the receiving controllers 4(#1) to 4(#4) through the system bus SYSBUS in order to store the received data such as a frame buffer FB and the received management data such as a frame descriptor FD.

The physical interface means 5 is a means for converting a signal received from the network NET to a later-described signal handled by the receiving controllers 4(#1) to 4(#4). The receiving signal RCV as output from the physical interface 5 is provided to the receiving sections 4A(#1) to 4A(#4).

The receiving controller 4(#i) (i = 1 to 4) is made up of a receiving section 4A(#i), an arbitration section 4B(#i), an FD acquisition section 4C(#i), and an FD address storage section 4D(#i).

The receiving section 4A(#i) processes the receiving signal RCV provided from the physical interface 5, converts the receiving signal into the frame, compares this destination address with the physical address, and judges whether it is designated or not, then only the frame which is to be received is written into the frame buffer FB in the receiving buffer memory 2.

When the frames are not all able to enter one frame buffer FB, the FB list is stored in the next unit in sequence. After receiving is completed, the addresses at the beginning and the end of the FB list used by that frame, the frame length, and the receive completion status are written into the frame descriptor FD. For this reason, the receiving buffer memory 2 is connected through the system bus SYSBUS.

Figure 4:
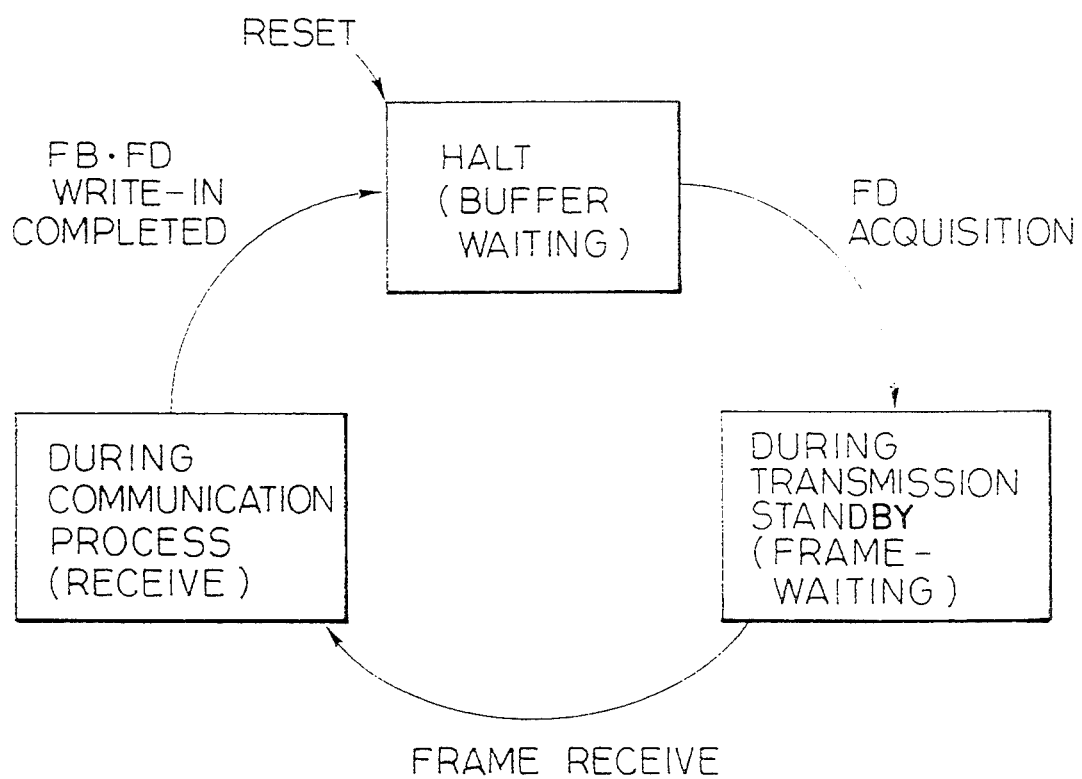
FIG. 4 is a state transition diagram of a communication control device of the present invention.

The operation state of the receiving section 4A(#i) is controlled in accordance with the state transition diagram of FIG. 4, as will be later explained. The state of each of the receiving sections 4A(#1) to 4A(#4) is output as a status signal STAT on a status signal line connected to all the receiving control means 4(#1) to 4(#4). The status signal line STAT is a bidirectional signal line, and the output from the receiving means 4A(#i) is connected in wired OR manner.

There are three operating states for the receiving means 4A(#i). These are the "receiving (the communication processing)", the "frame waiting (the communication standby)", and the "buffer waiting (the halt)" and these states are controlled in accordance with the state transition diagram of FIG. 4.

When the reception section 4A(#i) is in the frame-waiting state, the logical value "1" is output on the status signal line from the reception section 4A(#i), otherwise, the logical value "0" is output on it. The status signal STAT is supervised by each receiving means 4A(#i) and when the logical value is "0", the fact that the receiving section 4A(#i) "waiting a frame" does not exist is detected.

The arbitration sections 4B(#1 to #4) are interconnected with the arbitration bus ARBUS. The arbitration bus AIRBUS is used to select one receiving section to be switched to the "frame-waiting" state from a plurality of receiving sections 4A(#i) in a "buffer waiting" state.

When the receiving section 4A(#i) belonging to the arbitration section 4B(#i) is in the "buffer waiting" state, the arbitration section 4B(#i) outputs a request signal on the arbitration bus ARBUS. When the status signal STAT is "0" one receiving section 4A(#i) is selected using the request signals output from the arbitration sections 4B(#i), and the fact that this selection has been made is notified to the FD acquisition section 4C(#i) by a selection signal WIN.

When the status signal STAT has the logical value "1" and when it is not selected, the selection signal WIN is not output.

The FD acquisition section 4C(#i) reads out the frame descriptor FD for which the address is stored in the FD address storage section 4D(#i) from the receiving buffer memory 2 when the selection signal WIN is input, and transfers that frame descriptor FD to the receiving section 4A(#i). In this case, the next FD signal NFD is output when the next FD address field is read out. The next FD signal NFD is also output in the initializing operation for the processor 1 to set the head address of the FD list.

The FD address storage section 4D(#i) takes in data which has been output to the data bus of the system bus SYSBUS when the next FD signal NFD is output and the FD address is renewed. Because the next FD signal NFD is provided simultaneously to all the FD address storage section 4D(#i), the FD addresses can be renewed simultaneously.

The process state of the receiving section 4A after resetting enters the "buffer waiting" state. This is the state in which the assignment of the frame descriptor FD is held. When the frame descriptor FD is assigned it is switched to the "frame waiting" state. This state is the state which waits the receiving of the frame from the network NET.

In the case where the received frame is the frame to be received by that node, a transition is made to the "receiving" state for writing the received data into the receiving buffer memory 2. In the case where this frame is not to be received, it remains continuously in the "frame waiting" state. After all the received data has been written in, and after the contents of the frame descriptor FD have been set, a switch is made to the "buffer holding" state.

Next, the operation of this embodiment will be explained with reference to the timing chart shown in FIG. 5.

(1) Initialization Phase

Prior to communication, a plurality of FD structures and a plurality of FB structures are formed in the receiving buffer memory 2 by the processor 1.

The processor 1 distributes the frame buffer FB into the respective receiving sections 4A(#1) to 4A(#4) and the head address of the frame descriptor FD linked in list form is provided to the FD address storage sections 4D(#1) to 4D(#4). For this reason, the next FD signal NFD is output while the head address is being output to a data bus in the system bus SYSBUS.

Subsequently, the processor 1 resets all the receiving sections 4A(#1) to 4A(#4) and sets them in the "buffer waiting" state. Accordingly, because there are no units in the "frame waiting" state, arbitration is carried out immediately, and the arbitration means 4B(#1), for example, is selected.

This selection process is realized by setting beforehand a priority order to each receiving section 4A(#i), for example.

On this selection, the FD acquisition section 4C(#1) reads out the frame descriptor FD, and the next FD address set in the frame descriptor FD is set in all the FD address storage sections 4D(#1) to 4D(#4).

The receiving section 4A(#1) which has acquired the frame descriptor FD is switched to the "frame waiting" state and can be received.

(2) First Frame Receiving Processing

When the frame is received from the network NET, a signal is provided to all the receiving sections 4A(#1) to 4A(#4) through the physical interface 5, the frame is checked, and the decision as to whether receiving is possible is restricted to the receiving section 4A(#1) which is in the "frame waiting" state. If the decision is made that receiving is possible the receiving section 4A(#1) is switched to the "receiving" state and the data is written into the frame buffer FB which has been previously provided from the processor 1.

At the same time, the status signal STAT is converted from the logical value "1" to "0", and the arbitration sections 4B(#1) to 4B(#4) are activated. In this case, one unit in the "buffer waiting" state is selected (for example, in FIG. 5 the arbitration section 4B(#2) is selected), and the frame descriptor FD connected to the above-mentioned frame descriptor FD is read out. Also, the address of a third frame descriptor FD is set in all the FD address storage section 4D(#1) to 4D(#4).

(3) Second Frame Receiving Processing

In the process outlined in (2) above, the receiving section 4A(#2) which was in the "frame waiting" state received a frame. Next, the receiving section 4A(#3) to be in the frame waiting state is selected. This operation is the same as the processing in (2), and the receiving section 4A(#1) first received by the process in (2) does not participate in arbitration because it is in the "receiving" state.

(4) First Frame Completion Process

In the first receiving section 4A(#1), when all the data in the first frame is written into the frame buffer FB, the address of the first FB and the last FB of the FB list in which this frame is stored is written into the frame descriptor FD. The frame length and completion status are written into the frame descriptor FD and the completion of the receiving is notified to the processor 1.

Subsequently the first receiving section 4A(#1) is switched to the buffer waiting state, making the receiving of the following frame possible.

(5) n-th Frame Receiving Processing

In the explanation of (2) and (4) above, it is considered that the frames are received in the installed sequence in the receiving sections 4A(#1) to 4A(#4), but, in actual fact, they operate correctly out of sequence. Depending on the length of time required for the frame completion process, the time, required until switching to the "buffer waiting" state is not uniform, therefore the subsequently executed receiving section 4A(#j) are placed in the "buffer waiting" state first.

Accordingly, as shown in FIG. 5, with the receiving sections 4A(#1) and 4A(#2) in the "receiving" state, the receiving section 4A(#3) in the "frame waiting" state, and the receiving section 4A(#4) in the "buffer waiting" state, it is probable to receive the n-th frame at the same time when the receiving section 4A(#2) is switched to the "buffer waiting" state.

Under such condition, the receiving section 4A(#3) receives the n-th frame, and it is difficult to judge in advance whether only the receiving section 4A(#4), or both the receiving section 4A(#2) and the receiving section 4A(#4), are participating in arbitration. This is because frame receiving transition to the "buffer waiting" state occurs asynchronously.

In this manner, whichever of the receiving section 4A wins the arbitration, even when a forecast is not possible, the same value is maintained in each of the FD address storage section so that the frame descriptor FD to be accessed is the same value and the request for the FD list to be followed in sequence is satisfied.

Figure 6:
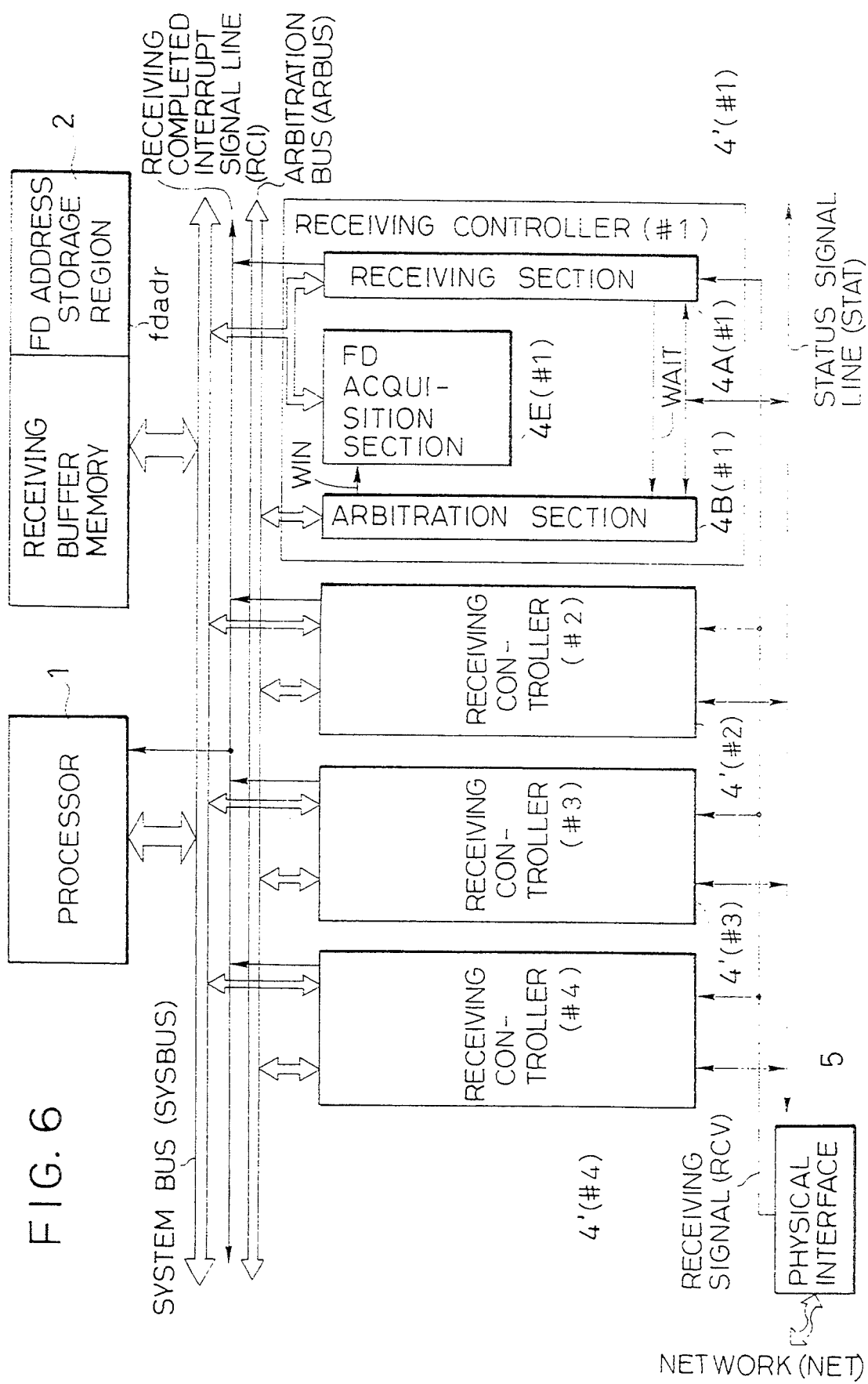
FIG. 6 is a configuration diagram of a second embodiment of a communication control device of the present invention.

In another preferred embodiment of the communication control device of the present invention, as shown in FIG. 6, an address storage means fdad for holding the address of the data structure of one receiving-possible frame descriptor is provided for the communication control device with the second and third special features, and this device is also provided with FD management means made up only of FD acquisition means 4E(i) (i=1 to 4).

An another preferred embodiment of the communication control device having above-described feature will be described in detail.

FIG. 6 is a configuration diagram of a communication control device 600 as a second embodiment according to the present invention.

This embodiment of the communication control device 600 is a modification of the first embodiment. As illustrated in FIG. 6, this embodiment of the present invention, in the same manner as the first embodiment shown in FIG. 3, have a processor 1 for processing high rank communication protocol; a receive buffer memory 2 for storing frames containing control data and communication data; four receive controllers 4′(#1) to 4′(#4) for processing low rank communication protocol; and a physical interface 5 for physically interfacing with a network NET.

The processor 1, in the same manner as in the first embodiment, is connected to the receive buffer memory 2 through a system bus SYSBUS. Also, receive control means 4′(#1) to 4′(#4) are connected via the system bus SYSBUS and a receive completed interrupt signal line RCI. The processor 1 makes a data structure for a frame descriptor FD and a frame buffer FB in the receive buffer memory 2. The frame descriptor FD links next FD descriptor FD in one list by using a next FD address field in the frame descriptor FD. In addition, the processor 1 sets the frame descriptors FDs into a FD address storage section fdadr in a later-described receiving storage memory 2 and distributes the FBs among the receive controllers 4′. The explanation of the operation thereafter is deleted because it is the same as for the first embodiment.

The FD address storage region fdadr which contains a usable frame descriptor FD is secured in the receiving buffer memory 2 and is accessed by the processor 1 and the receiving controllers 4′(#1) to 4′(#4).

Each of the receiving controllers 4′(#1) to 4′(#4) is made up of a receiving means 4A(#1) to 4A(#4), arbitration sections 4B(#1) to 4B(#4), and FD acquisition sections 4E(#1) to 4E(#4). The receiving sections 4A(#1) to 4A(#4) and the arbitration sections 4B(#1) to 4B(#4) are the same as in the first embodiment, therefore further explanation is omitted.

The FD acquisition sections 4E(#1) to 4E(#4) access the FD address storage region fdadr in the receiving buffer memory 2 when a selection signal WIN is input in order to read out the frame descriptor FD from the receiving buffer memory 2 by the indicated address and transfer the frame descriptor FD to the receiving means 4A(#1) to 4A(#4).

Also, the next FD address field read out is written into the FD address storage region fdadr in the receiving buffer memory 2 as the next usable FD address.

The operation of the communication controller of this embodiment is the same as the operation of the communication controller of the first embodiment except for the following three points:

(1) the fact that the processor 1 does not set the head of the FD list in the FD storage sections but rather sets it in the FD address storage region fdadr of the receiving buffer memory 2;

(2) the fact that the FD acquisition sections 4E(#1) to 4E(#4) does not access the FD storage sections to obtain the FD address but rather reads out of the FD address; storage region fdadr; and (3) the fact that, when the contents of the frame descriptor FD have been read out, the next FD address field is not written into the FD storage sections but rather into the FD address storage region fdadr.

Accordingly, although further explanation is omitted, the configuration of the FD acquisition section in the receiving controller become simple, and it is not required to use a next FD signal NFD.

Before describing another preferred embodiments we will explain a basic concept of the following embodiments.

Figure 7:
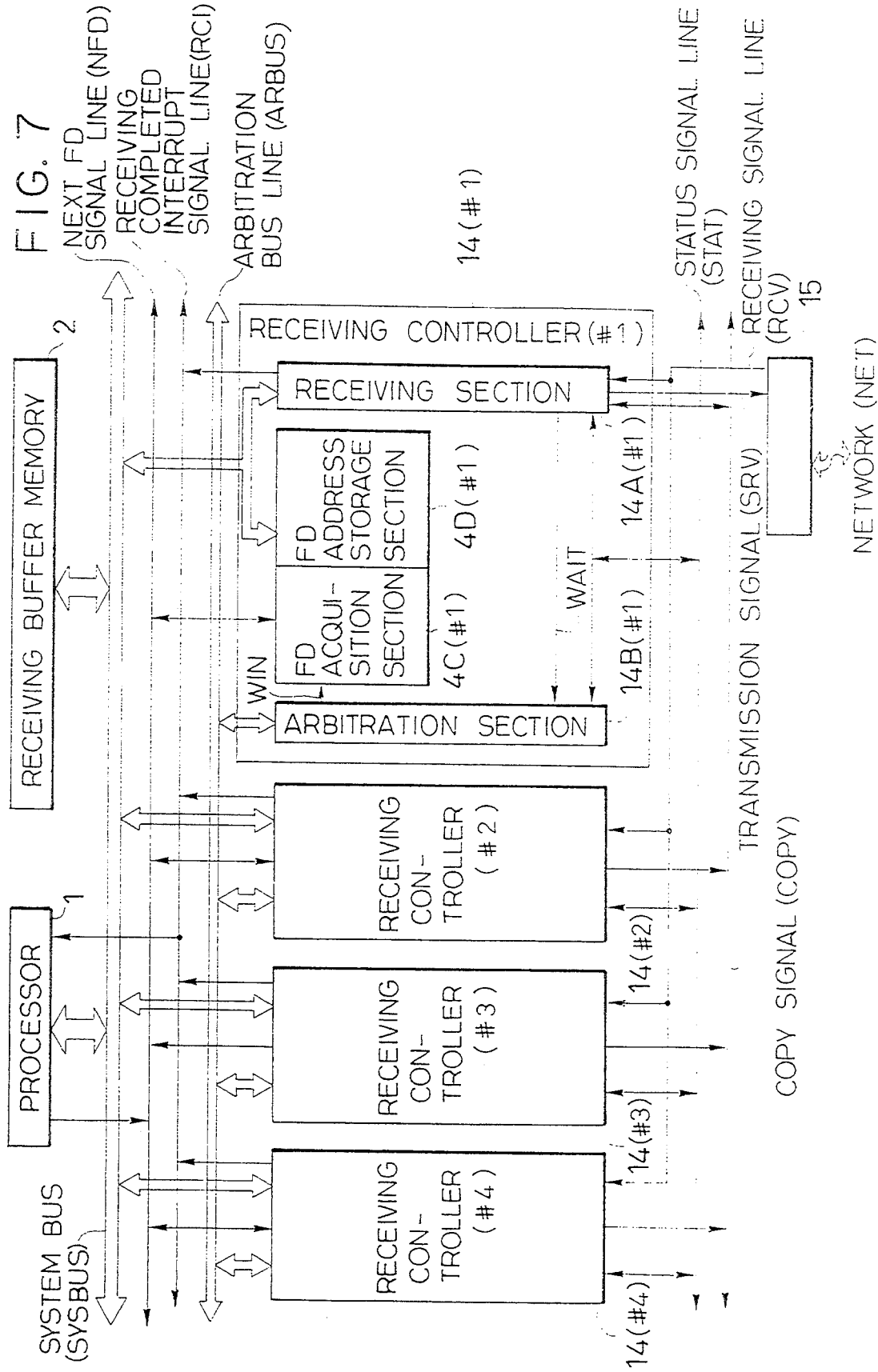
FIG. 7 is a configuration diagram of a third embodiment of a communication control device of the present invention.
Figure 10:
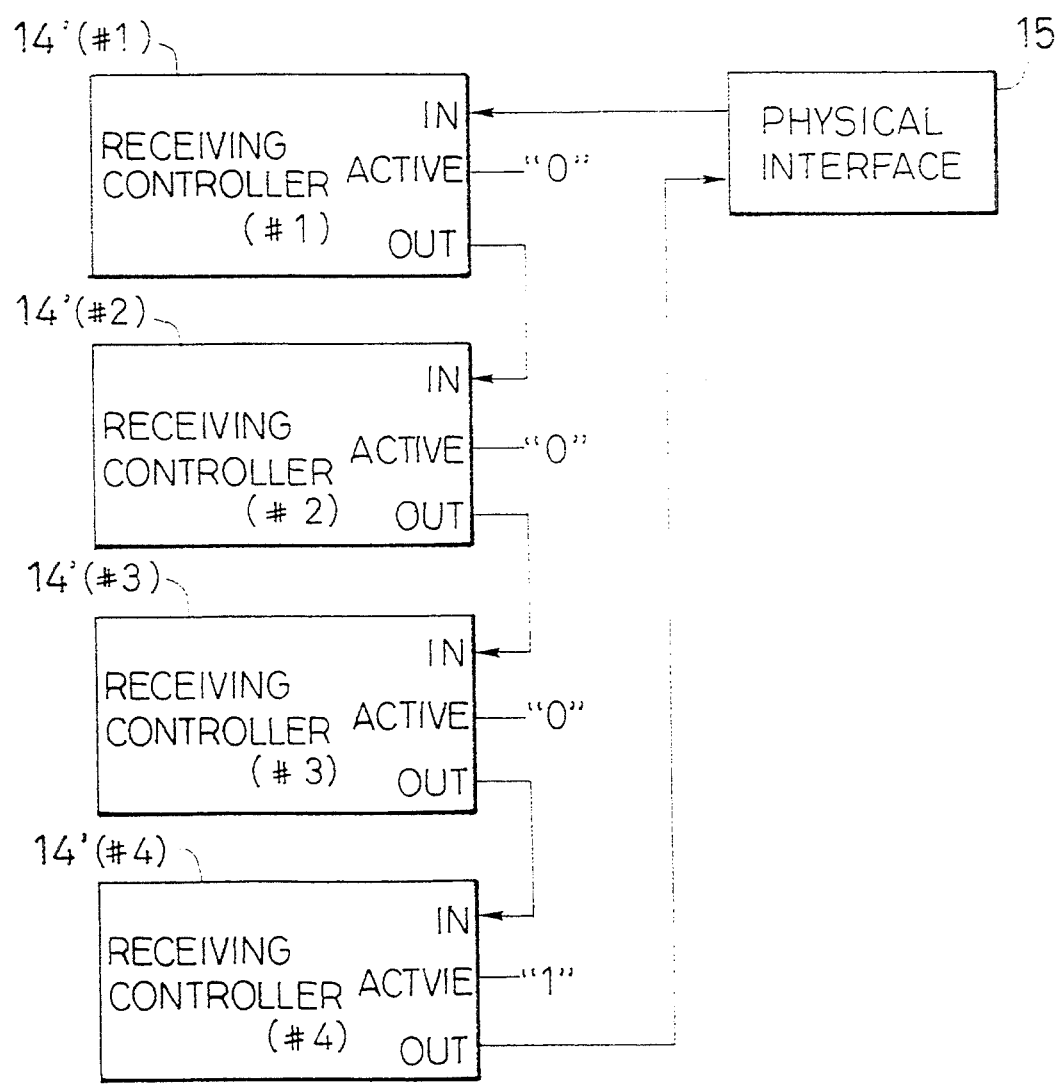
FIG. 10 is a configuration diagram of a fourth embodiment of a communication control device of the present invention.

In a communication control device of the present invention with another special features, as shown in FIG. 7 and FIG. 10, the communication control device is used for a ring-structured network NET′.

Reproduction of the frame is relayed for the communication station in the ring-structured network NET′ and it is necessary to set a address recognized bit and a frame copied bit in the frame status field.

The function of transmitting and receive is simultaneously provided in a physical interface means 15 and-/or a communication means or receiving control means (hereinafter referred to as receiving control means) 14′(#1) to 14′(#4). In addition, the reception control means 14′(#1) to 14′(#4) are provided with a control signal ACTIVE for selecting whether or not a MAC layer protocol is processed. The control signal ACTIVE is provided so that one receiving control means 14′(#i) (i=1 to 4) only processes the MAC layer protocol, and only the transmission signal of that receiving control means) 14′(#i) becomes the transmission signal for the physical interface means 15. A receiving signal RCV received by the physical interface means 15 is provided to the receiving control means 14(#1) to 14(#4), and a transmission signal SRV which is output by one of the receiving control means 14′(#i) (i=1 to 4) passes through the physical interface means 15 and is sent to the network NET′.

As a result, even when all the receiving control means 14(#1) to 14(#4) have the same structure, no matter which of the receiving control means 14(#1) to 14(#4) copies the frame, the frame copied can be correctly set. In addition, the address recognition is set from the results of the investigation of the receiving control means 14(#i) designated by the control signal ACTIVE, and a communication control device can be provided which can be applied to the ring-structured network NET.

Further, in continuous frame reception, the operation of selecting the receiving control means 14(#1) to 14(#4) has the same use and effect as the communication control device with the special features which have been already described in the embodiment shown in FIGS. 3 to 6. Also, in the manner of the communication control device of the present invention, it is possible to have a configuration whereby the physical interface means 15 and the reception control means 14′(#1) to 14′(#4) are constructed in a cascade connection and a signal received by the physical interface means 15 from the network NET′ is provided to the first reception control means 14′(#1).

The signal transmitted by the first receiving control means 14′(#1) is provided to the second receiving control means 14(#2). Then, the signal transmitted by the last receiving control means 14(#4) is delivered to the network NET′ through the physical interface means 15.

FIG. 7 is a configuration diagram of a third embodiment of a communication control device 700 of the present invention. The communication control device of this embodiment is suitable for an IEEE802.5 type token ring LAN.

As illustrated in FIG. 7, this communication control device 700 of the present invention, in the same manner as the first embodiment, has a processor 1 for processing high rank communication protocol; a receiving buffer means 2 for storing frames containing control data and communication data; four receiving controllers 14(#1) to 14(#4) for processing low rank communication protocol; and a physical interface 15 for physically interfacing with a network NET'.

In this case, the receiving section 14A(#1) in the receiving controller 14(#1) has a function of communication transferring ability, and the receiving sections 14A(#2) to 14A(#4) in the receiving controllers 14(#2) to 14(#4) do not have the communication transferring ability shown in FIG. 7.

With the exception of receiving means 14A(#1) to 14A(#4) within the receiving controller 14(#1) to 14(#4), the other structural components are identical to those of the first embodiment, therefore further explanation is omitted.

With a token ring LAN the reproduction of the frame at each communication station must be relayed and an "address recognized bit" (hereinafter called as "an A bit"), a frame copied bit (hereinafter called as "a C bit") set in the frame status field. For this reason, the physical interface 15 must not merely receiving from the network NET' but also must transmit.

The relay function is carried out by the first receiving control section 14(#1). All the receiving sections 14A(#1) to 14A(#4) have the identical physical address, therefore because the result of a comparison with the destination address of the frame is the same, the A bit is set from the results of a comparison with the receiving sections 14A(#1). On the other hand, whether or not the frame has been taken in cannot be judged solely by the first receiving controller 14(#1). For this reason, as opposed to the first receiving controller 14(#1), the receiving sections 14A(#2) to 14A(#4) output a copy signal COPY showing that the frame has been correctly taken in, and the receiving section 14A(#1) sets the C bit when this signal is output.

In a situation of this embodiment, only the first receiving controller 14(#1) has a special function. Because the receiving section 14A(#1) in the receiving controller 14(#1) has a function of communication transferring ability, and the receiving sections 14A(#2) to 14A(#4) in the receiving controllers 14(#2) to 14(#4) do not have the communication transferring ability shown in FIG. 7.

On the other hand, because of large scale integration it is desirable that all the receiving controllers 14(#1) to 14(#4) have the same configuration.

Figure 8:
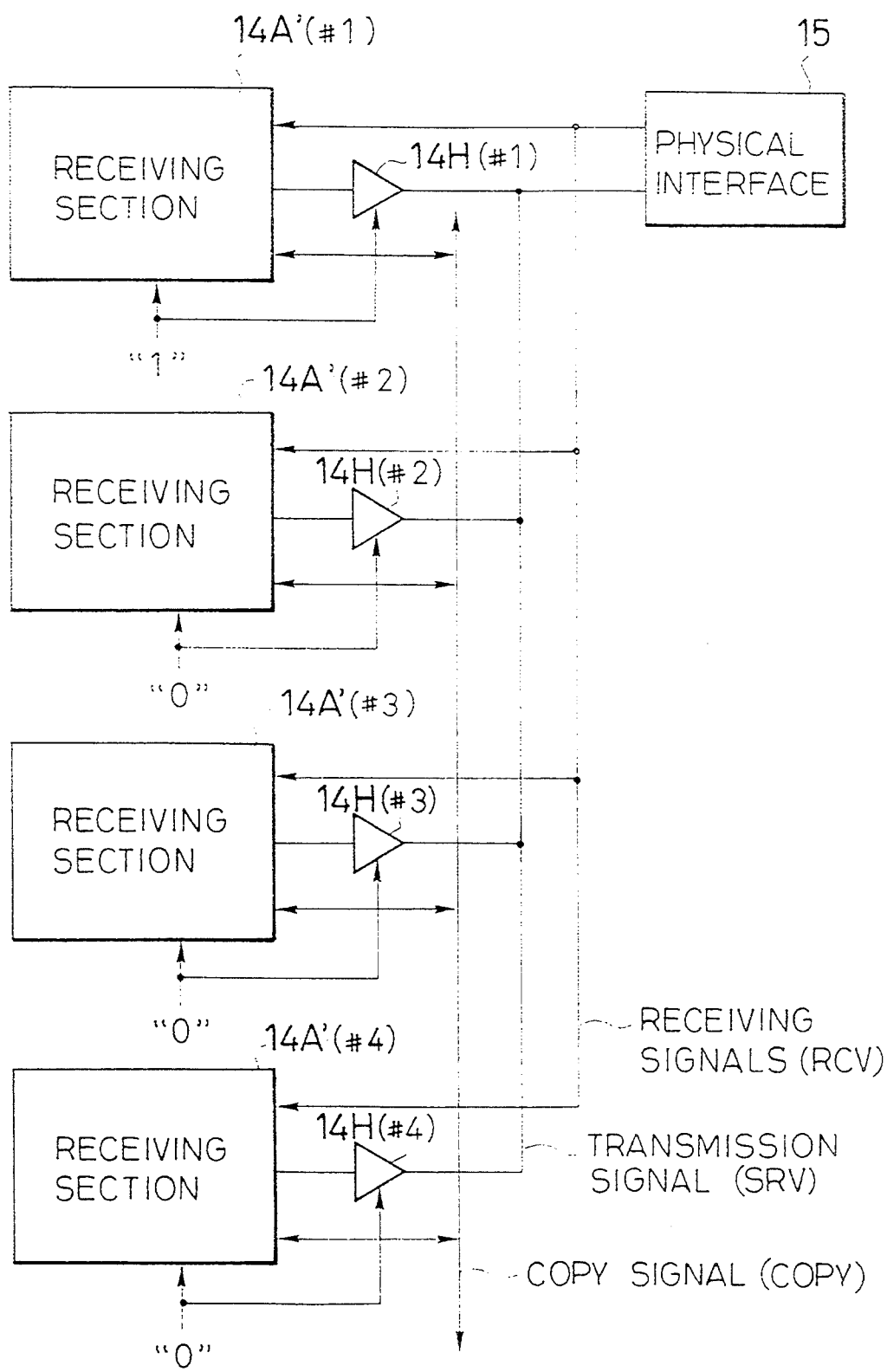
FIG. 8 is a connection diagram for a receiving sections and a physical interface for a modification of the third embodiment of the communication control device shown in FIG. 7.

This problem can be solved by using receiving sections 14A'(#1) to 14A'(#4) with the structure shown in FIG. 8. The receiving sections 14A'(#1) to 14A'(#4), in addition to operating as the state machine shown in FIG. 4, carry out the communication processing of the MAC layer for the token ring LAN. Here, an active signal ACTIVE is a signal input from a source external to the communication control device (LSI). The logical value "1" (referred to as the active state) is provided to the receiving section 14A'(#i) which sends out data to the physical interface 15, and the logical value "0" (referred to as the inactive state) is provided to the receiving means 14A'(#j), which only receives.

Data output by the receiving section 14A'(#i) passes through a tristate buffer 14H(#i) and is input to the physical interface 15. The active signal ACTIVE is connected to the control input of the tristate buffer 4H(#i).

When the logical value is "1", data is output; when "0", a high impedance state is entered. Accordingly, the output line for the try-state buffer 14H(#i) is connected to the transmitted data input for the physical interface 15. However, only the output of a single receiving section 14A'(#i) is input to the physical interface 15. The copy signal COPY is used as a bidirectional signal. A wired OR of the copy signal COPY output by the receiving sections 14A'(#1) to 14A'(#4) is input to the receiving sections 14A'(#1) to 14A'(#4) and set in the C bit of the status field. The copy signal COPY is controlled so that the receiving section 14A(#i) which writes that frame into the receiving buffer memory 2 outputs a logical value "1".

Figure 9:
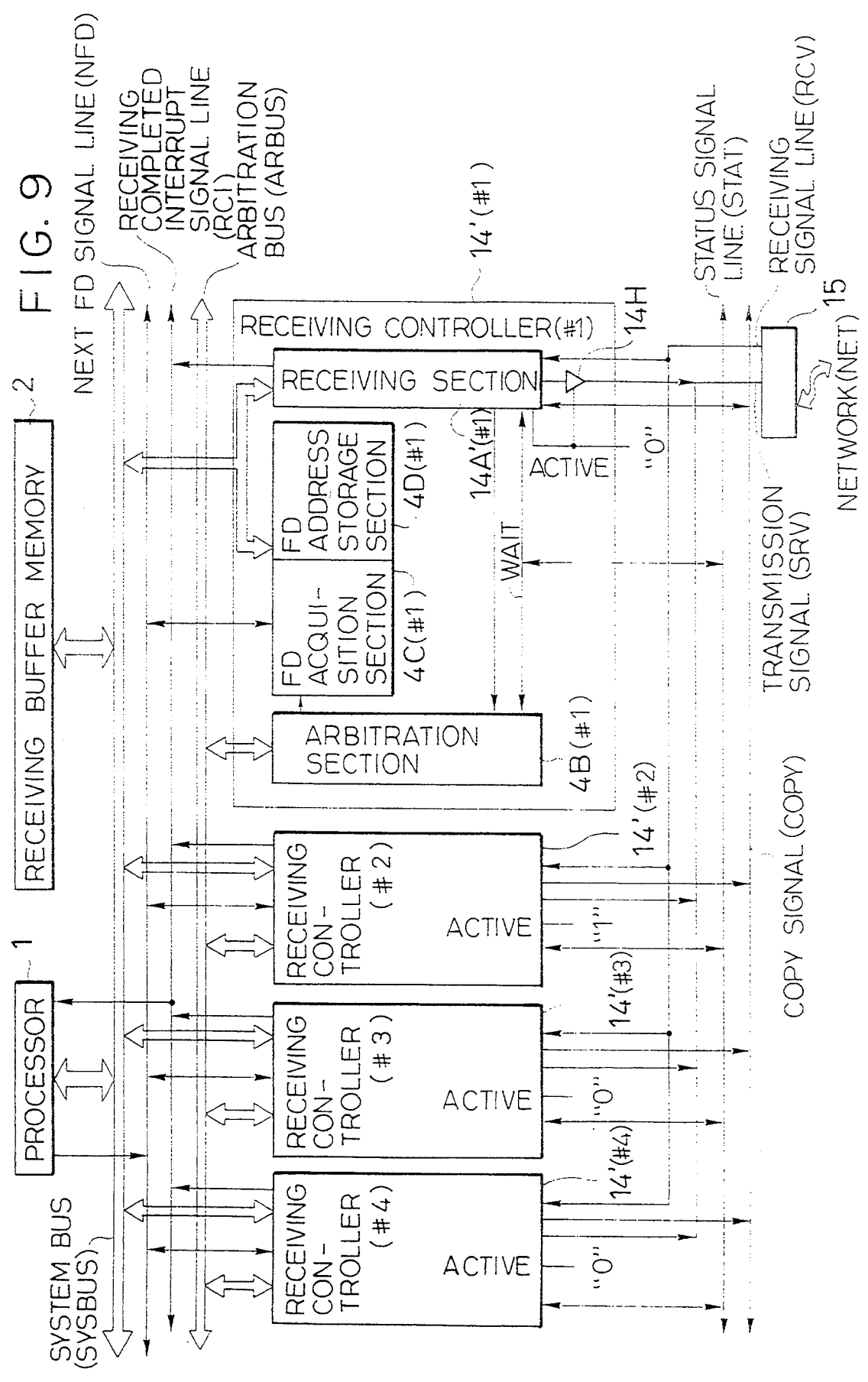

FIG. 9 shows a communication control device 900 having four receiving control devices 14'(#1) to 14'(#4) provided with the receiving sections 14A'(#1) to 14A'(#4) shown in FIG. 8.

Here, the logical value "1" is provided to the active signal ACTIVE for the second receiving control device 14'(#2), while the logical value "0" is provided to the other receiving controllers 14'(#1), 14'(#3), and 14'(#4). Accordingly, the receiving signal RCV output from the physical interface 15 is provided to all the receiving controllers 14A'(#1) to 14A'(#4), and the transmission signal SRV output to the network NET' is restricted to being output to the second receiving controller 14'(#2).

The second receiving controller 14'(#2) in the active state also outputs the copy signal COPY when a frame is received, and inputs this COPY signal to set the frame status C bit.

In the case where the receiving controller 14'(#1), 14'(#3), and 14'(#4) in the inactive state receiving a frame, the device outputs the copy signal COPY, and the second receiving control device 14'(#2) in the active state receives the copy signal COPY and sets the frame status C bit. Accordingly, no matter which of the receiving controllers 14'(#1) to 14'(#4) takes in a frame, the frame status C bit is correctly set. Also, the A bit is set as a result of checking-the second receiving controller 14'(#2). Because the frames are received continuously, the operation by which the receiving controller 14'(#1) to 14'(#4) are selected is the same as in the first and second embodiments, therefore further explanation is omitted.

FIG. 10 is a configuration diagram of a fourth embodiment of a communication control device 1000 of the present invention.

In the communication control device 700 as the third embodiment the receiving controllers 14'(#1) to 14'(#4) are connected in parallel with the physical interface 15. However, a cascade connection is also possible. This configuration of the communication control device 1000 is shown in FIG. 10.

Specifically, the communication control device 1000 of this embodiment is used for a ring-shaped network NET'. The physical interface 15 and the receiving controllers 14'(#1) to 14'(#4) are provided with the same functions as before, sending and receiving. The physical interface 15 and the receiving controllers 14'(#1) to 14'(#4) are joined in a cascade connection. The signal received by the physical interface 15 from the network NET' is provided to the first receiving controller 14'(#1), and the signal transferred by the first receiving controller 14'(#1) is provided to the second receiving controller 14'(#2). The signal transferred by the last receiving controller 14'(#4) is sent out over the network NET' through the physical interface 15.

The signals received from the network NET' pass in sequence through the receiving controllers 14'(#1) to 14'(#4). It is therefore possible to set the A bits and the C bits in the respective receiving controllers 14'(#1) to 14'(#4). Accordingly, the copy signal COPY shown in the communication control device 700 as the third embodiment shown in FIG. 7 becomes unnecessary. However, a means for checking for the existence of a communication station with a physical address overlapping the MAC layer protocol is stipulated and the value of the A bit is used in this check.

A condition of the embodiments according to the present invention is that the receiving controllers 14'(#1) to 14'(#4) maintain the identical physical address, therefore, only one receiving controller 14'(#i) (i=1 to 4) must set the A bit with respect to the frame related to the above-mentioned stipulation. Because of this control, a signal the same as the active signal ACTIVE stated in the communication control device 700 as the third embodiment is used. Specifically, only the receiving controller 14'(#i) which is in the active state carries out the operation in accordance with the above-mentioned stipulation. The other receiving controllers 14'(#j) (j=1 to 4 1) are controlled so that they do not set the A bit. Also, it is possible to have a configuration whereby the copy signal COPY discussed in the communication control device 700 as the third embodiment is provided and the status field is set by the receiving controller 14'(#i) in the active state, and this is not carried out with the inactive receiving controller 14'(#j).

Furthermore, the MAC layer can be used as an example of the layer in charge of the receiving controllers 14'(#1) to 14'(#4). A high rank layer being acceptable for being in charge is also easily visualized.

As described above in detail, according to the communication control devices of the present invention, the communication controllers are connected in a parallel arrangement. Each communication controller exhibit three states, specifically, "communication processing", "communication standby", and "halt". When the communication in the "communication standby" state is switched to the "communication processing" state for processing the frames, one of a plurality of communication controller in the "halt" state is selected and switched to the "communication standby" state while a data structure for processing the succeeding frame is picked out of the data structure list. Therefore, immediately one of the communication controller commences the receiving of frames, another communication controller is selected in the "communication standby" state so that the next frame can be received, and the frame descriptors are assigned one at a time in sequence to the communication controller selected in the "communication standby" state. Therefore, the sequence of the frames processed by the processor is the same as the sequence in which they are received from the network. As a result, one communication station is made up of a plurality of communication controllers which are provided with the identical physical address. The distribution of the receiving load of the frames is provided, and it is possible to realize a communication control device for the processor which can deliver frames in the sequence received from the network.

In addition, with a communication control device of the present invention, receiving sections, arbitration sections, and receiving controllers provided with a FD management means including the FD acquisition section and the FD address storage section are made up as an installation of a plurality of units in parallel.

The FD management means have three states—specifically, the "communication processing" state, the "communication standby" state, and the "halt" state. When the appropriate receiving section is in the "communication standby" state, a receiving signal input from a physical interface is processed, and the appropriate receiving section is switched to the "communication processing" state and stored in the receiving buffer.

After the receiving is completed, the data in the receiving buffer is stored in the above-mentioned data structure list, the processor is notified of the completion of the receiving, and the appropriate receiving section is switched to the "halt" state. When FD management means access the data structure of the frame descriptor FD, the appropriate receiving section is switched to the "communication standby" state. In the arbitration section a status signal shows that all the receiving sections are not in the "communication standby" state, and when the corresponding receiving section is in the "halt" state, a request is output to an arbitration bus, and only one is selected from among one or more receiving section which have output a request.

The FD management section access the data structure of the frame descriptor when the arbitration section outputs a request and the appropriate receiving controller is selected. When one receiving section commences frame receiving another receiving section is selected in the "communication standby" state so that it is possible to receiving the next frame. The receiving controllers can be provided with the identical physical address.

In addition, because the frame descriptors are allocated one at a time in sequence to the receiving means selected in the "communication standby" state, the sequence of the frames processed by the processor is the same as the sequence in which they are received from the network. As a result, a communication control device can be provided wherein it is possible for one communication station to be made up of a plurality of receiving controller which can be provided with the identical physical address for spreading the receiving load, and wherein the frames can be transmitted in the sequence received from the network by the processor.

Further, in the communication control device of the present invention, the function of transmitting and receiving simultaneously is provided in a physical interface and/or a communication device or receiving controller (hereinafter referred to as a receiving controller). The receiving controller is provided with a control signal for selecting whether or not a MAC layer protocol is to be processed. The control signal specifies that only one receiving controller processes the MAC layer protocol so that only the transmission signal of that receiving controller becomes the transmission signal of the physical interface. A signal received by the physical interface is provided to a plurality of receiving controller, and a transmission signal, which is output by one of the receiving controller, passes through the physical interface and is sent to the network. As a result, even when all the receiving controller have the same structure, the frame copied indicator can be correctly set, no matter which of the receiving control means copies the frame. In addition, the address recognition indicator is set from the results of the investigation of the receiving controller designated by the control signal, and a communication control device can be provided which can be applied to the ring-structured network.

In the above manner, with the present invention when either one receiving controller carries out the process of receiving a frame and writing it into a receiving buffer memory, another receiving controller can simultaneously enter the receiving-capable state. For example, even when the succeeding frame is continuous to the preceding frame and received, it can be received by the latter receiving controller, therefore there is no dropping of the received frame.

In addition, the sequence of the frames notified to the processor is identical to the sequence input from the network, and no substitution is developed. Because the receiving controllers maintain the identical physical address, they are handled as one station when viewed from another station, and it is not necessary that the processing of the sending station side be modified. Accordingly, a high-performance receiving section can be easily introduced into an existing network system. The time necessary to receive from the head to the end of the frame from the network has been shortened as the result of the improvement of communication technology and increase in transmission speeds.

On the other hand, as a result of the complication of writing into memory and the complication of details of processing by the communication control device, there is a tendency toward lengthening the processing time. Even in a case such as this, if a large number of receiving controller is installed as in the present invention, the simultaneous processing of a plurality of frames in parallel is possible. Also, in the case where the number of frames processed simultaneously does not satisfy the processing performance required by a server or the like, it is possible to cope by increasing only the number of receiving controllers. The increase is extremely easy because the receiving controllers are connected in parallel, and the connection of any other receiving controller is an unrelated operation.

Furthermore, a receiving controller which cannot operate because of a breakdown or the like does not participate in arbitration so that receiving can be processed with only the units capable of operation, without entering the receiving-capable state. For this reason, even if a breakdown occurs in a receiving controller, processing can still proceed with the other receiving controller, so that it is possible to construct a system which is resistant to breakdown. In addition, it is possible to repair a broken down receiving processing means while still using the system.

What is claimed is:

1. A communication control device comprising:
    physical interface means for physical interfacing with a network;
    a processor for processing high rank communication protocol of a frame transferred between said communication control device and the network through said physical interface means;
    a plurality of receiving control means for processing low rank communication protocol of the frame transferred through said physical interface means; and
    communication buffer means containing a data structure list for storing the frame with control data in a sequence order received by said physical interface means,
    wherein at least one of said plurality of receiving control means includes control means which sets each of said plurality of receiving control means into one of a communication processing state, a communication standby state, and a halt state, sets one of said plurality of receiving control means under the halt state into the communication standby state, and selects a data structure in said data structure list and gives the selected data structure to said one of said plurality of receiving control means under the communication standby state in order to process a following frame transferred from the network through said physical interface means.

2. A communication control device as claimed in claim 1, wherein each of the plurality of said receiving control means has said control means.

3. A communication control device comprising:
    physical interface means for physical interfacing with a network;
    a processor for processing high rank communication protocol of a frame transferred between said communication control device and the network through said physical interface means;
    a plurality of receiving control means for processing low rank communication protocol of the frame transferred through said physical interface means; and
    communication buffer means containing a data structure list for storing the frame in a sequence order received by said physical interface means,
    wherein each of said plurality of receiving control means has three states, specifically, a communication processing state, a communication standby state, and a halt state,
    at least one of said plurality of receiving control means comprises:
        arbitration means, when said at least one of said plurality of receiving control means transits from the communication standby state to the communication processing state, selects one of said plurality of receiving control means in the halt state to set it to the communication standby state; and
        frame data (FD) management means for acquiring one data structure in said data structure list to store control data of the frame received by the physical interface means, and
    each of said plurality of receiving control means comprises receiving means for processing the low rank communication protocol of the frame received by the physical interface means when the receiving control means is in the communication standby state and said physical interface means receives the frame from the network.

4. A communication control device as claimed in claim 3 wherein:
    each of said receiving means has three states, specifically the communication processing state, the communication standby state, and the halt state,
    a status signal is transferred among said receiving control means for advising whether or not said receiving control means is in the communication standby state;
    the receiving means/processes the frame input from said physical interface means when this receiving means is in the communication standby state, and stores this frame in the communication buffer means, then after the receiving of the frame is completed, stores the control data related with this frame in the data structure list, notifies the completion of receiving to said processor, shifts this receiving means to the halt state, and shifts this receiving means to the communication standby state when said FD management means accesses the data structure for a frame descriptor formed in said communication buffer means;

said arbitration means in each said receiving control means is connected to each other with an arbitration bus and inputs the status signal, and when the status signal indicates that no the receiving means are in the communication standby state and said receiving means are in the halt state, said arbitration means outputs a request on the arbitration bus, so that only one from among said receiving means which have output requests is selected;

said FD management means comprises:
an FD address storage means for storing an address of the frame descriptor for the following frame;
an FD acquisition means for accessing the frame descriptor based on the address stored in the FD address storage means; and
means for notifying all said FD management means of the address of the next frame descriptor at the same time as accessing the frame descriptor; and said FD management means accesses the frame descriptor when said arbitration means outputs a request and selects said receiving control means.

5. A communication control device as claimed in claim 3, further comprising an address storage means for storing the address of the data structure as a frame descriptor for the following frame;
wherein:
the FD management means picks out the address of the frame descriptor from the address storage means, accesses this frame descriptor, and sets the address of the next frame descriptor included in this frame descriptor in the address storage means.

6. A communication control device as claimed in claim 4, further comprising an address storage means for storing the address of the data structure as a frame descriptor for the following frame;
wherein:
the FD management means picks out the address of the frame descriptor from the address storage means, accesses this frame descriptor, and sets the address of the next frame descriptor included in this frame descriptor in the address storage means.

7. A communication control device as claimed in claims 1, wherein:
said communication control device is used in a network with a ring structure;
said physical interface means is provided with a function for simultaneous receiving and transmitting the frame;
the frame received by said physical interface means is provided to a plurality of said receiving means or said receiving control means; and
the frame transmitted by one of said receiving means or said receiving control means is transmitted to the network through said physical interface means.

8. A communication control device as claimed in claims 3, wherein:
said communication control device is used in a network with a ring structure;
said physical interface means is provided with a function for simultaneous receiving and transmitting the frame;
the frame received by said physical interface means is provided to a plurality of said receiving means or said receiving control means; and
the frame transmitted by one of said receiving means or said receiving control means is transmitted to the network through said physical interface means.

9. A communication control device as claimed in claims 4, wherein:
said communication control device is used in a network with a ring structure;
said physical interface means is provided with a function for simultaneous receiving and transmitting the frame;
the frame received by said physical interface means is provided to a plurality of said receiving means or said receiving control means; and
the frame transmitted signal output by one of said receiving means or said receiving control means is transmitted to the network through said physical interface means.

10. A communication control device as claimed in claims 1, wherein:
said communication control device is used in a network with a ring structure;
said physical interface means and said =receiving means or said receiving control means is provided with a function for simultaneous receiving and transmission;
wherein:
said physical interface means and a plurality of said receiving means or said receiving control means are connected in a cascade connection, a signal received by said physical interface means from the network is provided to a first receiving means or said receiving control means, the receiving frame of said first receiving means or receiving control means is provided to a second receiving means or receiving control means, and the receiving frame of the last receiving means or receiving control means is structured so that it is transmitted through said physical interface means to the network.

11. A communication control device as claimed in claims 3, wherein:
said communication control device is used in a network with a ring structure;
said physical interface means and said receiving means or said receiving control means is provided with a function for simultaneous receiving and transmission;
wherein:
said physical interface means and a plurality of said receiving means or said receiving control means are connected in a cascade connection, a frame received by said physical interface means from the network is provided to a first receiving means or said receiving control means, the receiving frame of said first receiving means or receiving control means is provided to a second receiving means or receiving control means, and the receiving frame of the last receiving means or receiving control means is structured so that it is transmitted through said physical interface means to the network.

12. A communication control device as claimed in claims 4, wherein:
said communication control device is used in a network with a ring structure;
said physical interface means and said receiving means or said receiving control means is provided with a function for simultaneous receiving and transmission;
wherein:
said physical interface means and a plurality of said receiving means or said receiving control means are connected in a cascade connection, a frame received by said physical interface means from the network is provided to a first receiving means or said receiving control means, the receiving frame of said first receiving means or receiving control means is provided to a second receiving means or receiving control means, and the receiving frame of the last receiving means or receiving control means is structured so that it is transmitted through said physical interface means to the network.

13. A communication control device as claimed in claims 7 wherein:
said receiving means or said receiving control means is provided with a control signal for selecting whether or not a MAC layer protocol is processed;
one receiving means or receiving control means only is provided in said control means so that the MAC layer protocol is processed, and outputs the frame to said physical interface means.

14. A communication control device as claimed in claims 1 wherein, the plurality of said receiving control means has an identical station address.

15. A communication control device as claimed in claims 3 wherein, the plurality of said receiving control means has an identical station address.

* * * * *